(12) United States Patent
Lienhart et al.

(10) Patent No.: US 7,356,618 B2
(45) Date of Patent: Apr. 8, 2008

(54) METHOD AND SYSTEM FOR SYNCHRONIZING PLATFORM CLOCKS IN A DISTRIBUTED WIRELESS PLATFORM

(75) Inventors: Rainer W. Lienhart, Santa Clara, CA (US); Igor V. Kozintsev, San Jose, CA (US); Dmitry N. Budnikov, Nizhny Novgorod (RU); Igor V. Chikalov, Nizhny Novgorod (RU); Sergey A. Egorychev, Dzerzhinsk (RU)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 10/749,989

(22) Filed: Dec. 31, 2003

(65) Prior Publication Data
US 2005/0228902 A1 Oct. 13, 2005

(51) Int. Cl.
*G06F 15/16* (2006.01)

(52) U.S. Cl. .............. 709/248; 709/201; 709/221; 342/31; 342/385; 348/423.1; 348/425.4; 348/500; 370/503; 713/375; 713/400

(58) Field of Classification Search ............ 709/221, 709/248, 201; 713/375, 400; 342/31, 385; 348/423.1, 425.4, 500; 370/503, 507–514, 370/516, 519, 520
See application file for complete search history.

(56) References Cited

U.S. PATENT DOCUMENTS

| | | | |
|---|---|---|---|
| 4,021,784 A | 5/1977 | Kimlinger | |
| 5,689,689 A | 11/1997 | Meyers et al. | |
| 5,697,051 A * | 12/1997 | Fawcett | 455/13.2 |
| 5,794,019 A | 8/1998 | Genduso et al. | |
| 5,974,056 A * | 10/1999 | Wilson et al. | 370/509 |
| 6,009,236 A * | 12/1999 | Mishima et al. | 386/111 |
| 6,028,853 A * | 2/2000 | Haartsen | 370/338 |
| 6,138,245 A * | 10/2000 | Son et al. | 713/400 |
| 6,188,703 B1 | 2/2001 | Dobson et al. | |

(Continued)

OTHER PUBLICATIONS

"Ex Parte Quayle Action Mailed Feb. 9, 2007", for U.S. Appl. No. 10/754,977.

(Continued)

*Primary Examiner*—Michael Won
(74) *Attorney, Agent, or Firm*—Blakely, Sokoloff, Taylor & Zafman LLP

(57) ABSTRACT

According to one embodiment of the present invention, a novel method and system are disclosed. In one embodiment, a first node records a first node local time of receiving a wirelessly transmitted packet, the first node local time recorded with a monotonically increasing clock of the first node. The first node wirelessly transmits the recorded local time to at least a second node. The second node records a second node local time of receiving the wirelessly transmitted packet and records the first node local time of receiving the wirelessly transmitted packet. The second node updates a second node timing model to synchronize with the first node, the updating based on the second node local time of receiving the wirelessly transmitted packet and the first node local time of receiving the wirelessly transmitted packet. In one embodiment, the method and system further include synchronizing sample numbers of a multimedia stream on the second node with the timing model of the second node, the timing model of the second node having been synchronized with the first node.

16 Claims, 9 Drawing Sheets

U.S. PATENT DOCUMENTS

| | | | |
|---|---|---|---|
| 6,229,479 B1 * | 5/2001 | Kozlov et al. | 342/357.06 |
| 6,246,325 B1 | 6/2001 | Chittipeddi | |
| 6,279,058 B1 | 8/2001 | Gulick | |
| 6,347,084 B1 * | 2/2002 | Hulyalkar et al. | 370/347 |
| 6,351,235 B1 * | 2/2002 | Stilp | 342/357.06 |
| 6,359,985 B1 | 3/2002 | Koch et al. | |
| 6,375,630 B1 * | 4/2002 | Gelvin et al. | 709/224 |
| 6,381,402 B1 | 4/2002 | Sugita et al. | |
| 6,490,256 B1 | 12/2002 | Jones et al. | |
| 6,591,370 B1 * | 7/2003 | Lovett et al. | 713/502 |
| 6,640,253 B2 * | 10/2003 | Schaefer | 709/248 |
| 6,697,103 B1 * | 2/2004 | Fernandez et al. | 348/143 |
| 6,714,611 B1 * | 3/2004 | Du et al. | 375/356 |
| 6,870,503 B2 * | 3/2005 | Mohamadi | 342/372 |
| 6,882,309 B2 * | 4/2005 | Bromley et al. | 342/357.12 |
| 6,904,536 B2 | 6/2005 | Hasegawa | |
| 6,906,741 B2 | 6/2005 | Canova, Jr. et al. | |
| 6,937,680 B2 | 8/2005 | Fong et al. | |
| 6,965,590 B1 | 11/2005 | Schmidl et al. | |
| 7,030,812 B2 | 4/2006 | Bekritsky et al. | |
| 2001/0056501 A1 * | 12/2001 | Law et al. | 709/248 |
| 2002/0018458 A1 * | 2/2002 | Aiello et al. | 370/348 |
| 2002/0059535 A1 * | 5/2002 | Bekritsky et al. | 713/400 |
| 2002/0064134 A1 * | 5/2002 | Lee et al. | 370/252 |
| 2002/0069299 A1 * | 6/2002 | Rosener et al. | 709/248 |
| 2002/0114303 A1 * | 8/2002 | Crosbie et al. | 370/338 |
| 2003/0012176 A1 * | 1/2003 | Kondylis et al. | 370/348 |
| 2003/0069025 A1 * | 4/2003 | Hoctor et al. | 455/456 |
| 2003/0172179 A1 * | 9/2003 | del Prado Pavon et al. | 709/236 |
| 2004/0125822 A1 * | 7/2004 | Jun et al. | 370/503 |
| 2005/0001742 A1 * | 1/2005 | Small | 340/988 |
| 2005/0166079 A1 | 7/2005 | Lienhart et al. | |
| 2005/0228902 A1 | 10/2005 | Lienhart et al. | |

OTHER PUBLICATIONS

"Notice of Allowance Mailed May 8, 2007", for U.S. Appl. No. 10/754,977.

* cited by examiner

METHOD AND SYSTEM FOR SYNCHRONIZING PLATFORM CLOCKS IN A DISTRIBUTED WIRELESS PLATFORM

NOTICE OF RELATED APPLICATIONS

This application is related to application Ser. No. 10/751,035, entitled "Method and System for Synchronizing Multimedia I/O with CPU Clock", filed on Dec. 31, 2003, and application Ser. No. 10/754,977, entitled "Method and System for Adaptation of Time Synchronization of a Plurality of Multimedia Streams", filed on Jan. 9, 2004, which applications are assigned to the assignee of the present application.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention generally relates to the field of distributed multimedia synchronization. More particularly, an embodiment of the present invention relates to synchronizing platform clocks on CPUs, chipsets and I/O devices in a distributed wireless platform.

BACKGROUND

One approach to provide additional computing power has been to utilize distributed computer environments. This approach enables several computers to collaboratively perform computational tasks within a reduced amount of time. Generally, the divide and conquer approach provided by such parallel computing approaches enables utilization of available personal computers, rather than purchasing of a high performance, server-based computer system for performing the computationally intensive tasks.

Distributed computing has generally, however, been applied to performing purely computational tasks and not to synchronized capture and/or processing of signals, especially audio/video signals (and data streams). Signal processing of audio/video signals (and data streams) are generally very sensitive to even very small differences in sampling rates (e.g., clock skew), jitter, and delays. Therefore, precise synchronization is very critical for high quality input/output processing, as well as for real-time performance and in general, robustness and reliability issues. But, precise capture and synchronized inputs are not guaranteed on current platforms.

For example, on the same personal computer (PC) platform, problems can arise when several input/output (I/O) devices are used to capture audio and visual information from video camera(s) and microphone(s). Due to the fact that the different I/O devices will be triggered by separate oscillators, resulting audio samples and video frames will not be aligned on an absolute time line (thus inducing some relative offsets). Moreover, due to differences in the oscillators' frequencies, audio and/or visual data will drift away across multiple channels/streams over time. Instabilities in the oscillators' frequencies will also not be perfectly correlated between each other.

Similarly, in the case of multiple PC platforms audio and visual I/O devices will not be synchronized in time scale inducing some relative offsets and data samples to drift relative to each other. The extent of the relative offset, drift, and jitter on the existing platforms depends on many hardware and software parameters and can be very significant, sometimes causing total degradation of the processed signals (from the non-synchronized input streams). Such drifts, delays, and jitters can cause significant performance degradation for instance for array signal processing algorithms.

For example, in an acoustic beam former with 10 centimeter (cm) spacing between microphones, an error of only 0.01 percent in time can cause error of 20 degrees in the beam direction. Due to this fact, current implementations of audio array process algorithms may rely on dedicated circuitry for the synchronization between multiple I/O channels. Unfortunately, implementing such an approach with existing PC platforms would require a major overhaul of the current hardware utilized by the PC platforms. Therefore, there remains a need to overcome one or more of the limitations in the above-described existing art.

BRIEF DESCRIPTION OF THE DRAWINGS

The invention is illustrated by way of example and not limitation in the figures of the accompanying drawings, in which like references indicate similar or identical elements, and in which.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Also, the use of the term general purpose computer (GPC) herein is intended to denote laptops, PDAs, tablet PCs, mobile phones, and similar devices that can be a part of a distributed audio/visual system.

Figure 1:
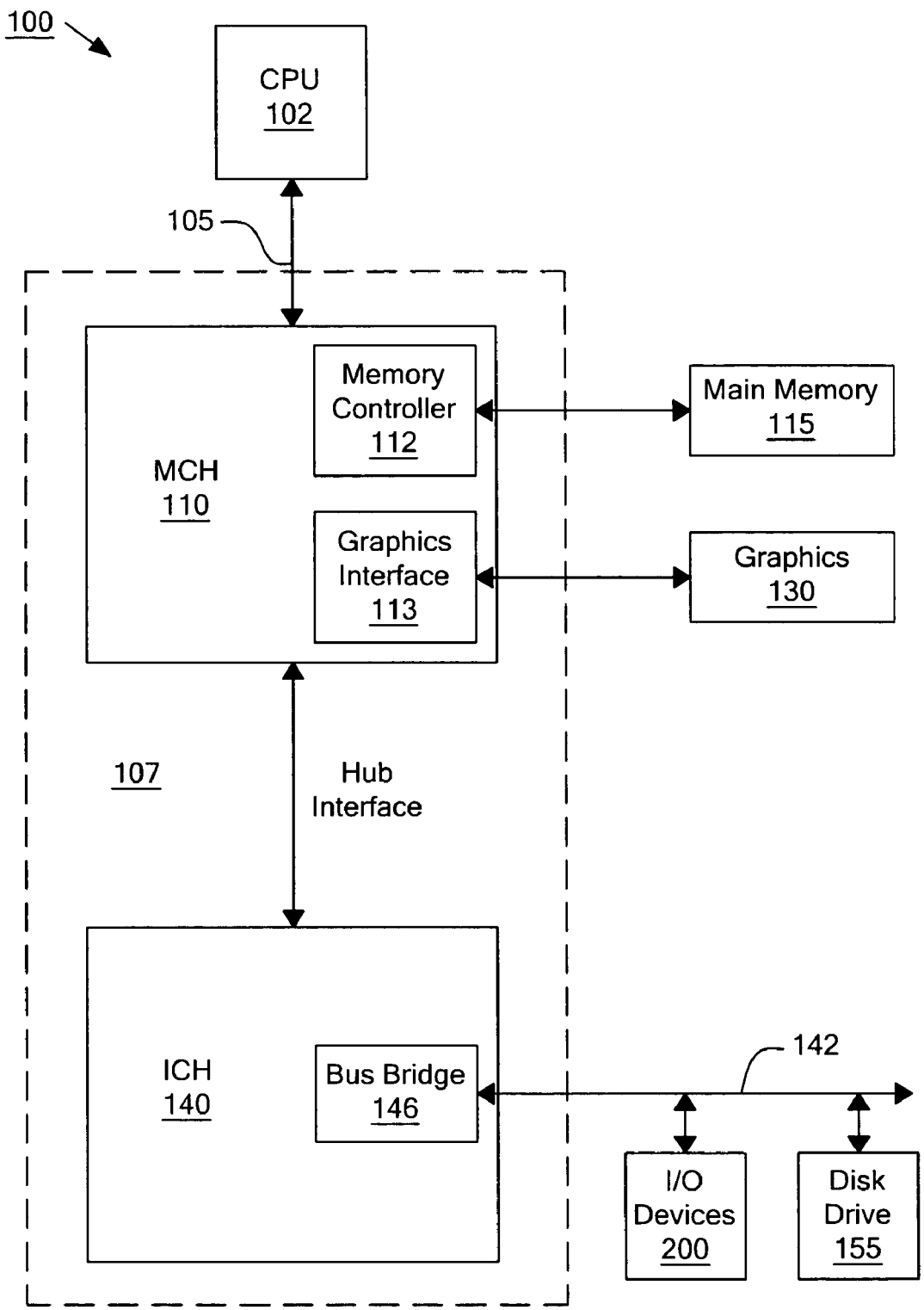
FIG. 1 illustrates an exemplary block diagram of a computer system 100 in which one embodiment of the present invention may be implemented.

FIG. 1 illustrates an exemplary block diagram of a computer system 100 in which one embodiment of the present invention may be implemented. The computer system 100 includes a central processing unit (CPU) 102 coupled to a bus 105. In one embodiment, the CPU 102 is a processor in the Pentium® family of processors including the Pentium® II processor family, Pentium® III processors, Pentium® IV processors available from Intel Corporation of Santa Clara, Calif. Alternatively, other CPUs may be used, such as Intel's XScale processor, Intel's Pentium M Processors, ARM processors available from ARM Ltd. of Cambridge, the United Kingdom, or OMAP processor (an enhanced ARM-based processor) available from Texas Instruments, Inc., of Dallas, Tex.

A chipset 107 is also coupled to the bus 105. The chipset 107 includes a memory control hub (MCH) 110. The MCH 110 may include a memory controller 112 that is coupled to a main system memory 115. Main system memory 115 stores data and sequences of instructions that are executed by the CPU 102 or any other device included in the system 100. In one embodiment, main system memory 115 includes dynamic random access memory (DRAM); however, main system memory 115 may be implemented using other memory types. Additional devices may also be coupled to the bus 105, such as multiple CPUs and/or multiple system memories.

The MCH 110 may also include a graphics interface 113 coupled to a graphics accelerator 130. In one embodiment, graphics interface 113 is coupled to graphics accelerator 130 via an accelerated graphics port (AGP) that operates according to an AGP Specification Revision 2.0 interface developed by Intel Corporation of Santa Clara, Calif. In an embodiment of the present invention, a flat panel display may be coupled to the graphics interface 113 through, for example, a signal converter that translates a digital representation of an image stored in a storage device such as video memory or system memory into display signals that are interpreted and displayed by the flat-panel screen. It is envisioned that the display signals produced by the display device may pass through various control devices before being interpreted by and subsequently displayed on the flat-panel display monitor. The display device may be a liquid crystal display (LCD), a flat panel display, a plasma screen, a thin film transistor (TFT) display, and the like.

In addition, the hub interface couples the MCH 110 to an input/output control hub (ICH) 140 via a hub interface. The ICH 140 provides an interface to input/output (I/O) devices within the computer system 100. In one embodiment of the present invention, the ICH 140 may be coupled to a Peripheral Component Interconnect (PCI) bus adhering to a Specification Revision 2.1 bus developed by the PCI Special Interest Group of Portland, Oreg. Thus, the ICH 140 includes a bus bridge 146 that provides an interface to a bus 142. In one embodiment of the present invention, the bus 142 is a PCI bus. Moreover, the bus bridge 146 provides a data path between the CPU 102 and peripheral devices.

The bus 142 includes I/O devices 200 (which are further discussed with reference to FIG. 2) and a disk drive 155. However, one of ordinary skill in the art will appreciate that other devices may be coupled to the PCI bus 142. In addition, one of ordinary skill in the art will recognize that the CPU 102 and MCH 110 may be combined to form a single chip. Furthermore, graphics accelerator 130 may be included within MCH 110 in other embodiments.

In addition, other peripherals may also be coupled to the ICH 140 in various embodiments of the present invention. For example, such peripherals may include integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Moreover, the computer system 100 is envisioned to receive electrical power from one or more of the following sources for its operation: a power source (such as a battery, fuel cell, and the like), alternating current (AC) outlet (e.g., through a transformer and/or adaptor), automotive power supplies, airplane power supplies, and the like.

Figure 2:
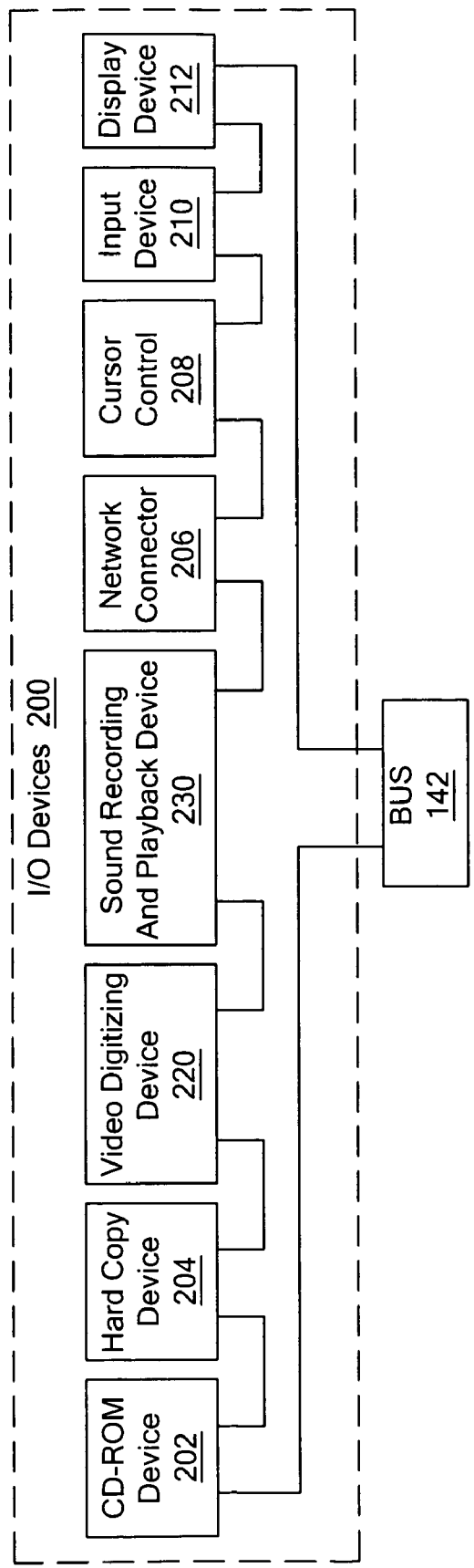
FIG. 2 further illustrates the I/O devices 200 of the computer system 100 as depicted in FIG. 1.

FIG. 2 further illustrates I/O devices 200 of the computer system 100 as depicted in FIG. 1. As illustrated, the computer system 100 may include a display device 212 such as a monitor. The display device 212 may include an intermediate device such as a frame buffer. The computer system 100 also includes an input device 210 such as a keyboard and a cursor control 208 such as a mouse, trackball, or track pad. The display device 212, the input device 210, and the cursor control 208 are coupled to bus 142. The computer system 100 may include a network connector 206 so that computer system 100 may be connected as part as a local area network (LAN) or a wide area network (WAN) such as, for example, the Internet.

Additionally, the computer system 100 can also be coupled to a device for sound recording and playback 230 such as an audio digitization device coupled to a microphone for recording voice input for speech recognition or for recording sound in general. The I/O devices 200 of computer system 100 may also include a video digitizing device 220 that can be used to capture video images alone or in conjunction with sound recording device 230 to capture audio information associated with the video images. Furthermore, the input devices 200 may also include a hard copy device 204 (such as a printer) and a CD-ROM device 202. The input devices 200 (202-212) are also coupled to bus 142.

Accordingly, the computer system 100 as depicted in FIG. 1 may be utilized to capture multimedia data including, for example, audio and/or video data from a selected scene, environment, or the like. Currently, many individuals utilize personal computers (PCs) such as depicted in FIG. 1 in order to capture live audio/video data (multimedia scene data) through, for example, a camera coupled to a port of computer system 100 (not shown) such as, for example, a USB port or a firewire port (IEEE 1394). This data is then provided as a streaming media format (Multimedia Stream Data) including, but not limited to, Microsoft® advanced steaming format (ASF) files, motion picture experts group (MPEG) standards such as MPEG-1/2/4, and audio layer-3 (MP3) files, Real Audio G2 files, QDesign2 files, or the like.

In one embodiment of the present invention, an audio capture device such as a microphone may be utilized by the computer system 100 to capture audio information associated with the captured multimedia scene data. Accordingly, as individuals attempt to utilize their personal computers in order to capture, for example, live audio/video data, it is generally recognized that audio/video data is most effectively captured utilizing one or more data capture devices.

With reference to FIGS. 1 and 2, the I/O devices (except AGP display adapters) are generally connected to the ICH (I/O hub) via dedicated or shared buses. The PCI bus can be a way to connect various audio, video, and networking devices to the ICH. These devices typically have their own crystal oscillators and clocks that are not synchronized to each other, and to the CPU clock. This means, for example, that if audio and video samples are captured using separate I/O cards, they can go out of sync as time passes by.

Unfortunately, the time it takes for a block of data to travel between I/O device, main memory, and CPU is variable and depends on many factors like the CPU load, cache state, activity of other I/O devices that share the bus, and the operating system behavior. Therefore, applications that process data have no way to know precisely the time the data enters or leaves the I/O devices. The propagation delay may range from nanoseconds to milliseconds depending on the conditions mentioned above.

In existing applications, multiple video and audio streams are usually captured using a single I/O device such as a multi-channel analog to digital (A/D) or audio/video (A/V) capture cards. Special methods are needed to use multiple I/O devices synchronously even on a single PC platform.

The situation becomes more complex when synchronization of I/O devices on separate platforms is desired. There, in addition to I/O-CPU latencies, network connection introduces additional delays, that are variable due to best-effort (and therefore variable transmission delay) type of Media Access Protocols used in existing wired and wireless Ethernet.

Overview of the Synchronization Variations

In one embodiment, each GPC has a local CPU clock (e.g., Real-Time Counter). As described herein, $t(t_i)$ is a value of the global time t at the CPU clock $t_i$ on the i-th device. As further described herein, $t(t_i)=a_i(t_i)t_i+b_i(t_i)$, where $a_i(t_i)$ and $b_i(t_i)$ are timing model parameters for the i-th device. The dependency of the model parameters on the CPU time $t_i$ approximates instabilities in the clock frequency due to variations. Given this linear model, one embodiment described herein provides for generating values for $a_i(t_i)$ and $b_i(t_i)$ to synchronize platform clocks in a network of wireless platforms.

Figure 3:
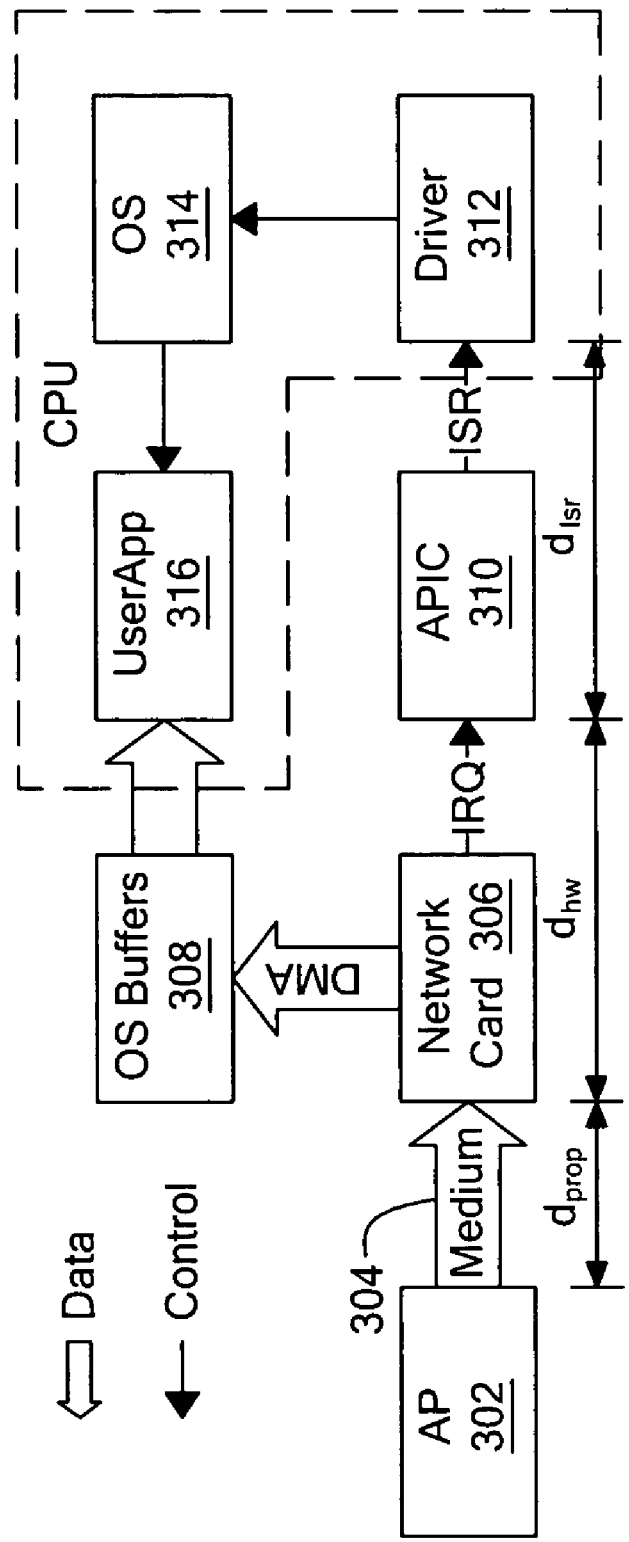
FIG. 3 illustrates a processing diagram for incoming packets, in accordance with one embodiment.

In order to understand the synchronization technique, a brief description is provided describing the operations and timing relationships on a GPC, in accordance with one embodiment, as illustrated in FIG. 3. A wireless packet sent by an access point (AP) 302 propagates in the medium 304 until the packet reaches the receiver. The propagation is modeled in FIG. 3 by the delay $d_{prop}$.

The incoming packet is received and processed by a hardware device 306 (e.g., network card), and eventually is put into a Direct Memory Access (DMA) buffer 308. The time for the hardware component is modeled in FIG. 3 by the delay $d_{hw}$, which is approximately constant for similar hardware modules.

A DMA controller transfers the data to a memory block allocated by the system and signals the event to the CPU by an Interrupt ReQuest (IRQ). The stage issuing the IRQ introduces variable delay due to memory bus arbitration between different agents (i.e., CPU, graphics adapter, other DMA's).

The interrupt controller (APIC) 310 queues the interrupt and schedules a time slot for handling. Because APIC is handling requests from multiple devices this stage introduces variable delay. Both previous stages are modeled by $d_{isr}$ in FIG. 3. The Interrupt Service Routine (ISR) of the device driver 312 is called, and the driver 312 sends notification to the Operating System (OS) 314. The OS delivers a notification and data to the user application(s) 316.

As described above, the data packet traverses multiple hardware and software stages in order to travel from network adapter to the CPU and back. The delay introduced by the various stages is highly variable making the problem of providing a global clock to the GPCs a very complicated one.

Inter-Platform Synchronization

In one embodiment, a series of arrival times of multicast packets sent by the wireless access point (AP) are used to synchronize CPU clocks of distributed platforms over a wireless network. In one embodiment, a pair wise time synchronization technique is used with one node chosen as the master (i.e., $t(t_0)=t_0$). Other nodes in the wireless network (i.e., clients) synchronize their clocks to the master. In an alternative embodiment, a joint timing synchronization may be used.

In one embodiment, to provide a global clock to distributed platforms, the global clock is to be monotonically increasing; and the speed of model parameter updates are limited to provide smooth time interval length adaptation.

Figure 4:
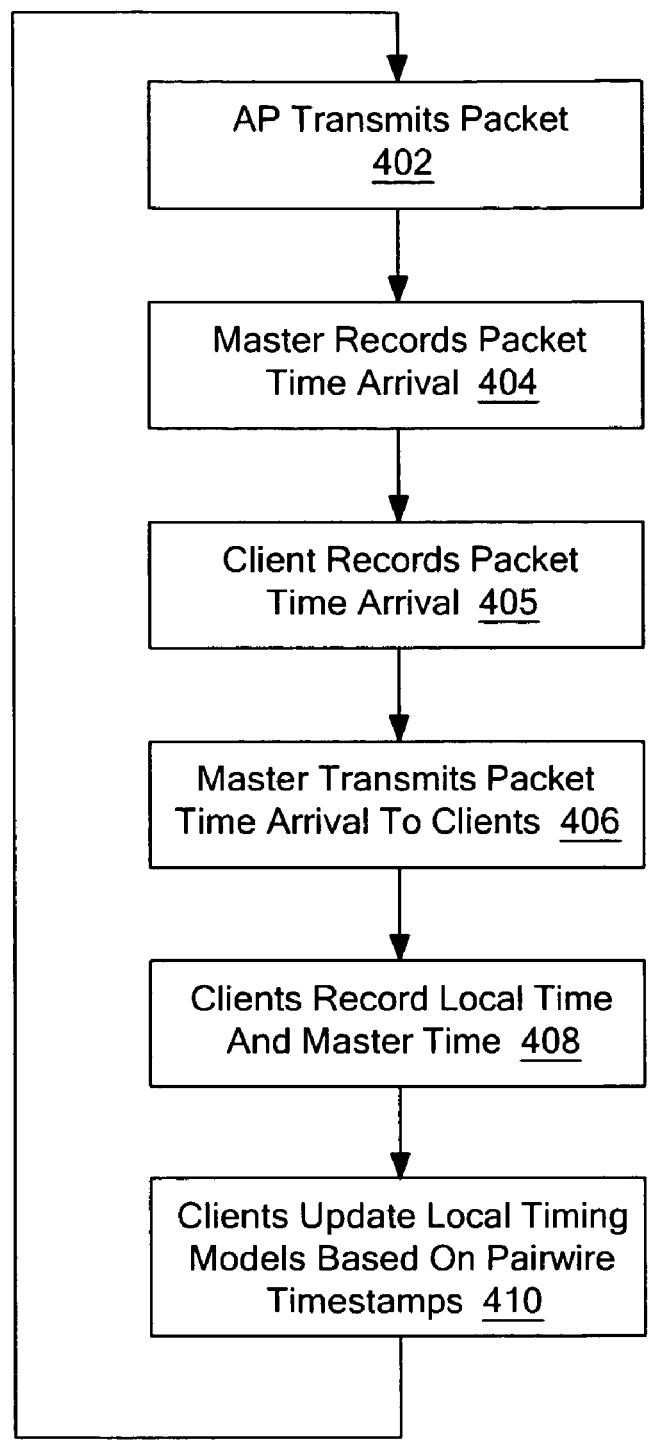
FIG. 4 illustrates a flow diagram describing the processes of pair wise synchronization, in accordance with one embodiment.

FIG. 4 presents a flow diagram describing the processes of pair wise synchronization, in accordance with one embodiment. In process 402, an AP transmits a beacon packet across the wireless network. In process 404, a pre-designated master node records the local time of the packet arrival, as the client node does as well in process 405. In process 406, the master node distributes the local time the master had received the beacon packet to all other nodes. In process 408, client nodes receive the times of the master of receiving the beacon packets from the AP. In process 410, the client nodes update local timing models based on the set of local timestamps and corresponding master timestamps. There afterwards, the processes 402 through 410 are repeated. In an alternative embodiment, using a joint optimization algorithm, all platforms exchange information about arrivals of beacon packets.

The pair wise synchronization mechanism is now described in greater detail. Assuming the beacon packet j arrives to multiple platforms approximately at the same global time corresponding to local clocks $t_{ij}(d_{prop}=0)$, the set of observations available on the platforms consist of a pairs of timestamps $(T_{0j}, T_{ij})$. As stated above, in the section on system synchronization, $T_j=t_j+d_{hw}+d_{isr}$ (omitting dependency on i) was introduced, which can also be approximated as a $T_j=t_j+d+n$.

In the approximation, d represents the constant delay component and n represents the stochastic component. Given the set of observations $(T_{0j}, T_{ij})$ the timing model parameters $a_i(t_i)$ and $b_i(t_i)$ for the client/slave platforms are to be generated.

In one embodiment upon receiving a new observation pair, updated current values of $a_i(t_i)$ and $b_i(t_i)$ are generated. In one embodiment, the updated values of $a_i(t_i)$ and $b_i(t_i)$ are generated using a least trimmed squares (LTS) regression. In one embodiment, LTS is equivalent to performing least squares fit, trimming the observations that correspond to the largest residuals (i.e., defined as the distance of the observed value to the linear fit), and then computing a least squares regression model for the remaining observations.

In one embodiment, the adaptive model update described above is based on a piecewise linear model for global time conversion (GTC). In the description below, a model adaptation example on a single host, is presented. Additionally, in the following, $Y_j=T_{0j}$ is denoted to be the sequence of master timestamps for packets j, and index i is omitted.

In one embodiment, the LTS regression over a current window of time takes as an input a set of observations ($Y_j$, $T_j$) and produces estimates of parameters (a,b). When a subsequent pair of observations becomes available the parameters are updated to track the current time model, thereby producing a piecewise timing model function.

Figure 5A:
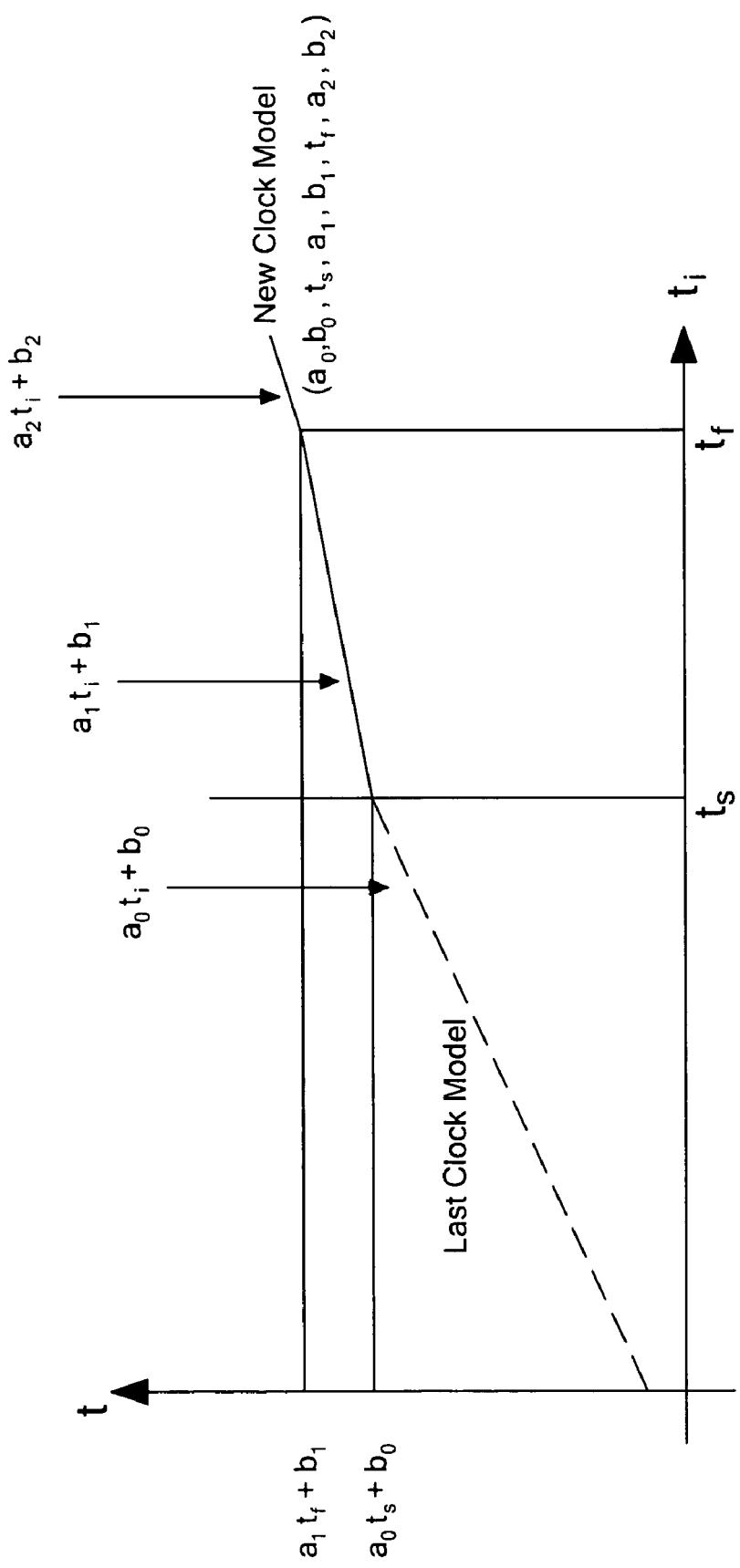
FIGS. 5a-5b illustrate piecewise linear model for GTC (Global Time Conversion), in accordance with one embodiment.

FIG. 5a illustrates one embodiment of the piecewise linear model with three linear regions for CPU clock $t_i$: [inf, $t_s$], [$t_s$, $t_f$] and [$t_f$, inf] and their respective parameters ($a_0,b_0$), ($a_1,b_1$), and ($a_2,b_2$). As previously stated, in one embodiment, the resulting function of the piecewise linear model is to be monotonically increasing, and slowly varying.

Figure 6:
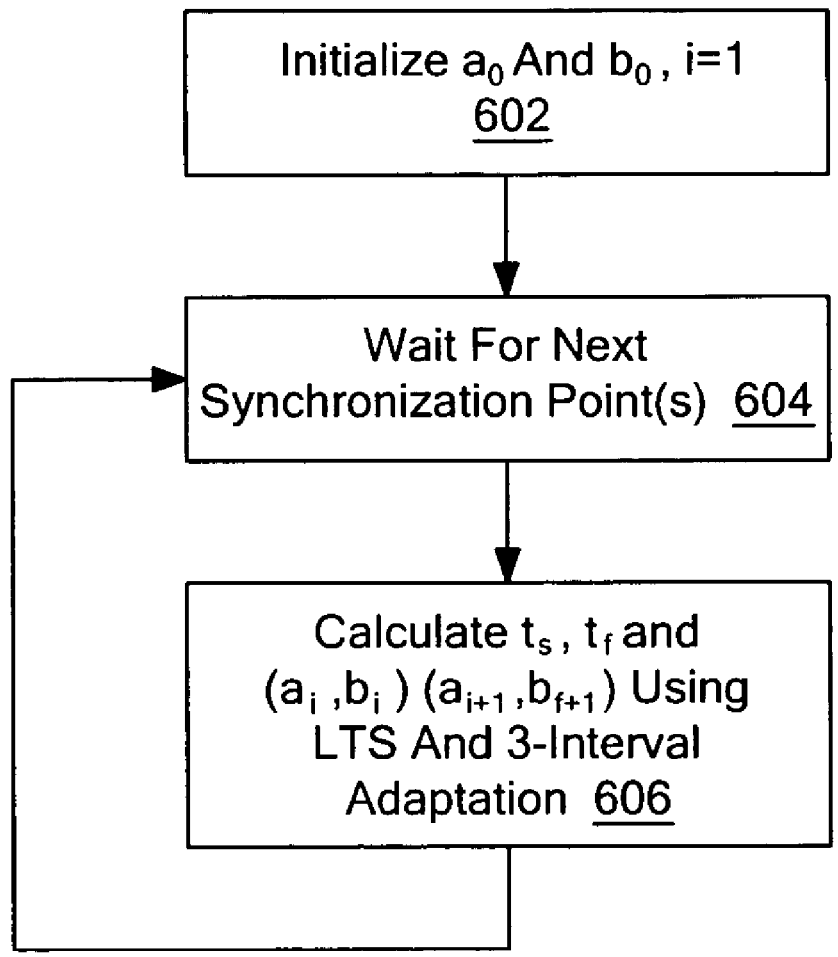
FIG. 6 illustrates a flow diagram describing the processes of model parameter adaptation, in accordance with one embodiment.

FIG. 6 presents a flow diagram describing the processes of the overall time synchronization algorithm for model parameter adaptation, in accordance with one embodiment. In process 602, model parameters are initialized to some values. In process 604, subsequent synchronization points are obtained. In process 606, the initial values of the model parameters are updated as new synchronization points are calculated.

Figure 5B:
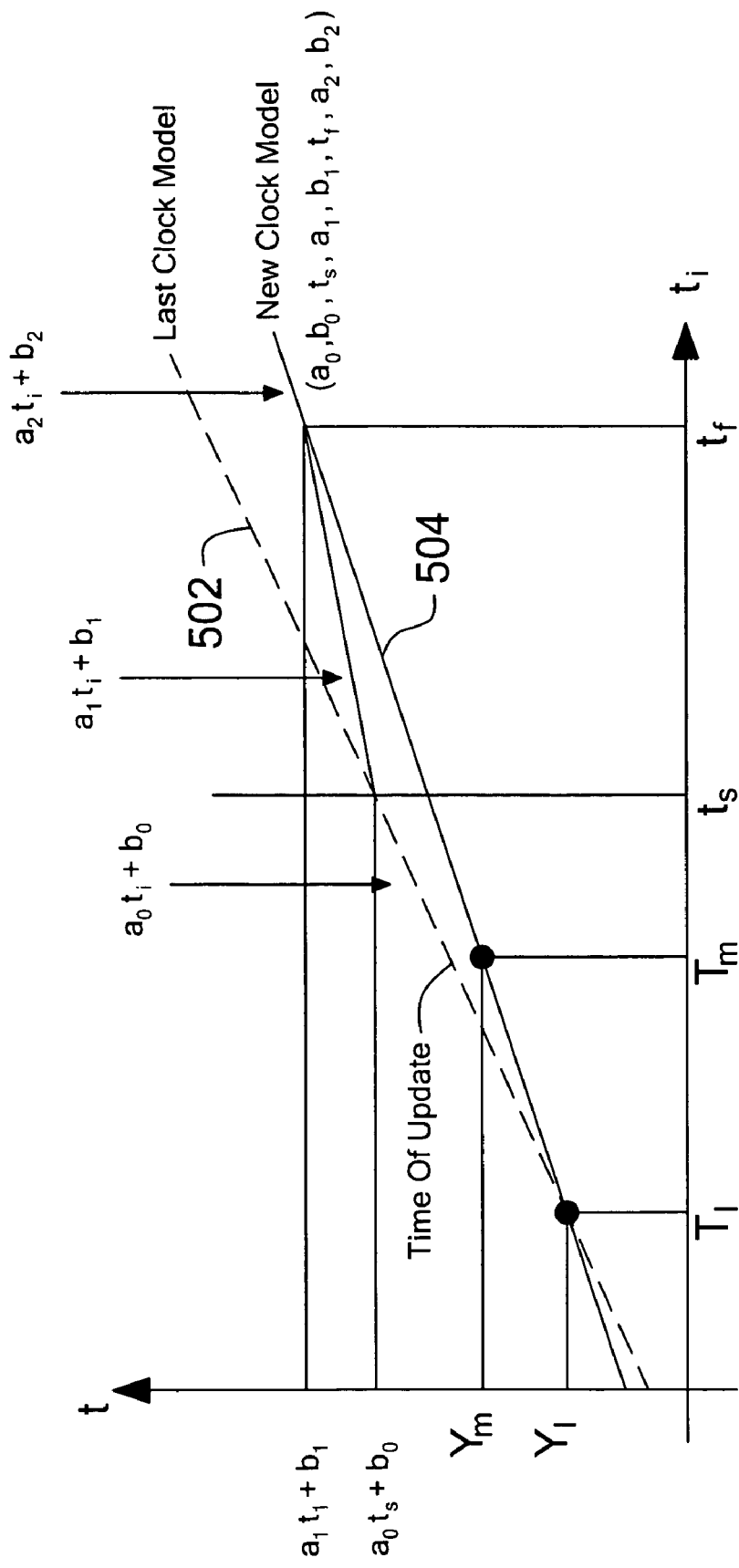

An example model rule adaptation is illustrated in FIG. 5b. As illustrated, after processing the synchronization point ($Y_1 T_1$), the GTC model is updated to the one shown by the dashed line 502 with parameters ($a_0,b_0$). When the next synchronization point ($Y_m T_m$) becomes available, the new model becomes the one represented by the solid line 504 with parameters ($a_2,b_2$). In an embodiment using continuous monotonic transformation of time, transitional model parameters ($a_1,b_1$) are calculated for moving from the old model (dashed line 502) to the new model (solid line 504) between times $t_s$ and $t_f$.

In one embodiment the current model parameters are stored in a shared computer memory in the form of two buffers containing ($a_0,b_0, t_s, a_1, b_1, t_f, a_2, b_2$) and an additional bit indicating which of the two buffers is currently valid.

Intra-Platform Synchronization

Figure 7:
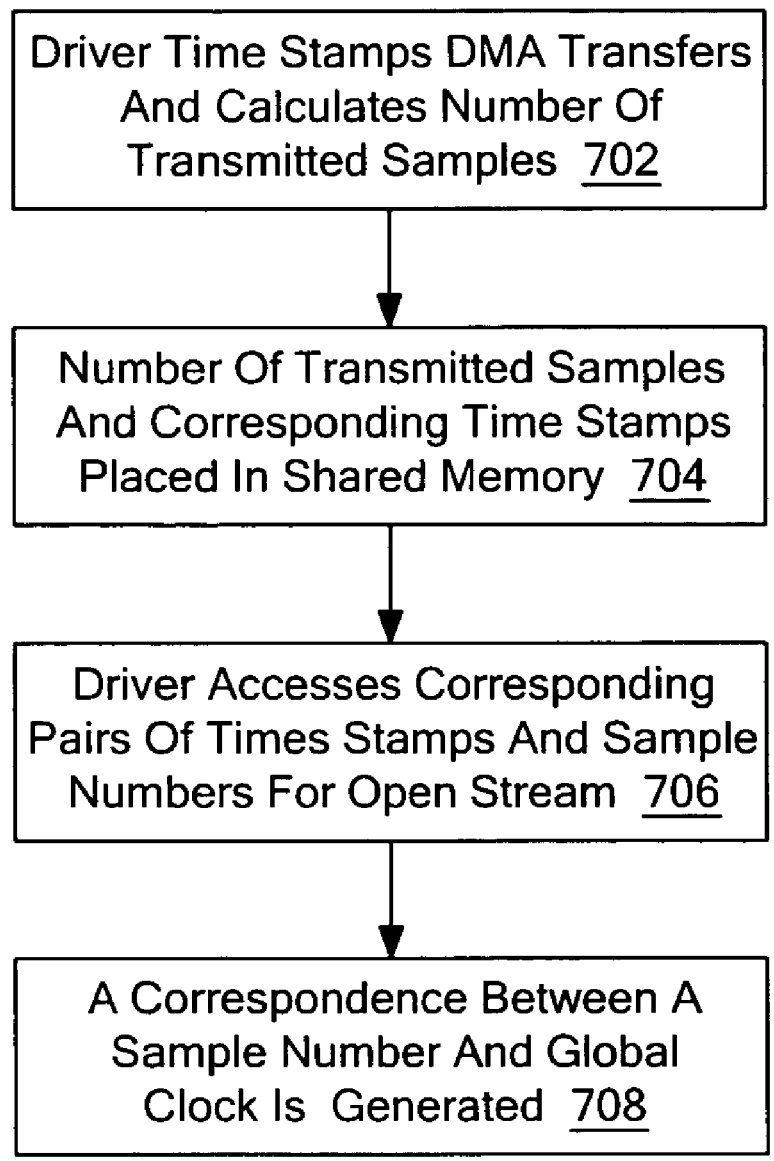
FIG. 7 illustrates a flow diagram describing the processes to find a relationship between global time value and local sample number in local I/O devices, in accordance with one embodiment.

Having described synchronizing platform clocks on the devices forming the distributed rendering/capturing system (i.e., wireless network), FIG. 7 presents a flow diagram describing the processes to find a relationship between global time value and local sample number (e.g., frame number for video or audio) in local I/O devices. In one embodiment, in process 702 a multimedia driver timestamps DMA data transfers and calculates number of transmitted samples (i.e., played or recorded). In process 704, the number of transmitted samples (sample position in the stream) and corresponding timestamps are placed into a shared memory from where it is transferred into user space by another driver. In the shared memory, user application level API functions have access to the sample number and timestamps data for further processing. When a multimedia stream is opened and started, in process 706 the multimedia driver is periodically inquired for corresponding pairs of timestamp and sample number. Having some history buffer of sample number and timestamp pairs, and parameters of synchronized clock for the current device, in process 708 a correspondence between a sample number and the CPU clock and hence the global (synchronized) clock value is generated.

Architecture of Distributed Synchronization System

Figure 8:
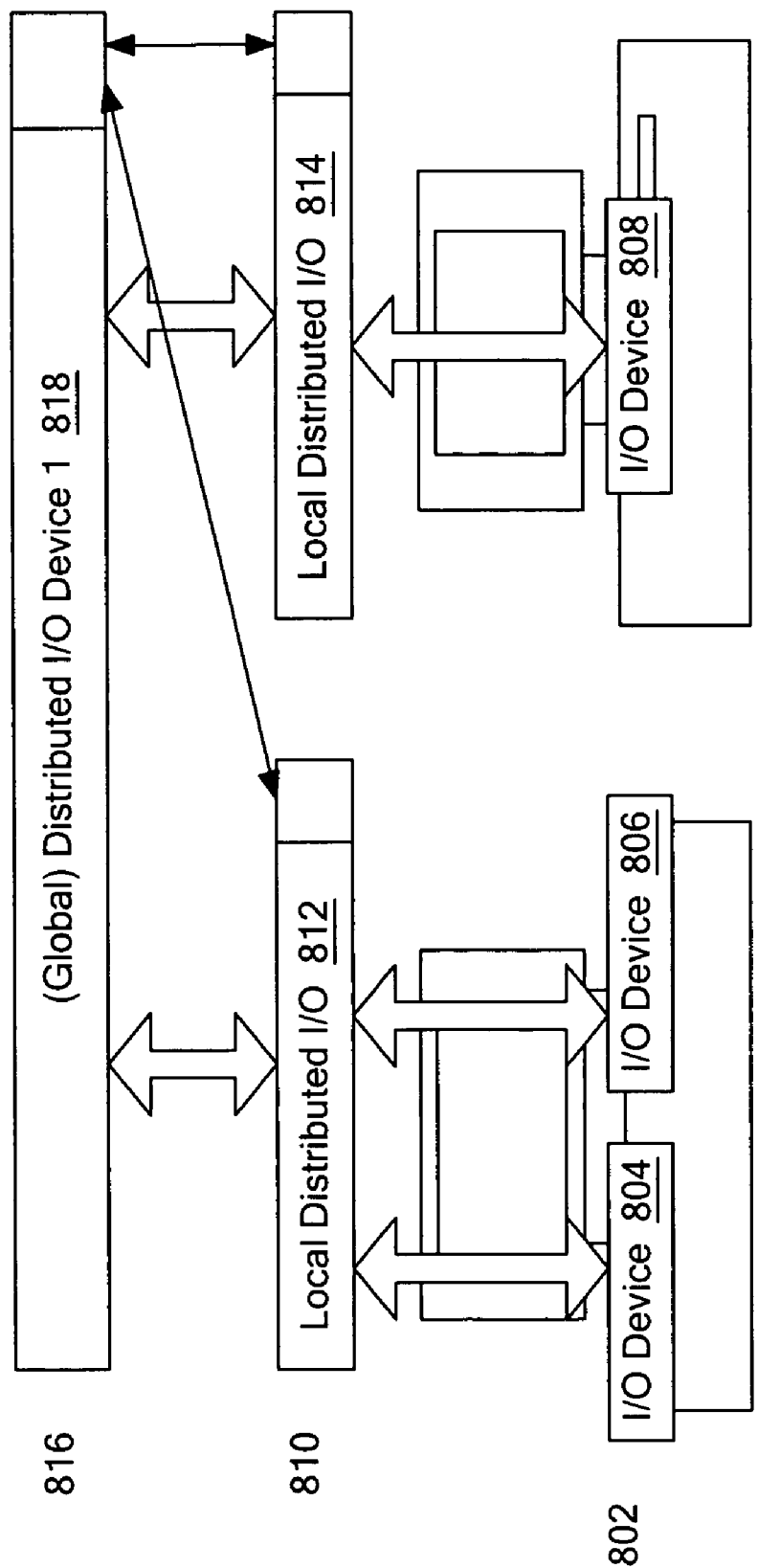
FIG. 8 illustrates diagram of layers of abstraction for distributed I/O devices, in accordance with one embodiment.

FIG. 8 illustrates the abstraction layers, in one embodiment, for representing multiple distributed I/O devices as a single multi-channel virtual I/O device. In one embodiment, additional layers are included to hiding the distributed nature of the hardware I/O devices and representing them as a single I/O device with the associated expected behavior.

As illustrated in FIG. 8, at the first layer I/O 802 devices 804, 806, and 808 are represented by their existing interfaces. At the second layer 810, the similar devices on the same platform are grouped into a Local Distributed I/O (LDIO) device 812, 814. At the second level, intra-platform synchronization is implemented. In one embodiment, physical devices participating in the same LDIO device are synchronized and offer the same interface to the application software as an individual I/O device. In an alternative embodiment, additional functionality (AF) may be included (e.g., such as information about the 3D position of input/output channels of the LDIO device).

At the third layer 816, the LDIO devices are combined into a single distributed I/O (DIO) device 818 using the principles and techniques described above for providing inter-platform synchronization. In one embodiment, the third layer 814 is also responsible for transferring data between nodes (e.g., over a wireless network).

Whereas many alterations and modifications of the present invention will no doubt become apparent to a person of ordinary skill in the art after having read the foregoing description, it is to be understood that any particular embodiment shown and described by way of illustration is in no way intended to be considered limiting. For example, although much of the description herein references the multimedia stream as audio, the techniques described herein would also apply to video streams. Therefore, references to details of various embodiments are not intended to limit the scope of the claims which in themselves recite only those features regarded as essential to the invention.

What is claimed is:

1. A method comprising:
   recording a first node local time of receiving a wirelessly transmitted packet at a first node, the first node local time recorded with a monotonically increasing clock of the first node;
   recording a second node local time of receiving the wirelessly transmitted packet at a second node, the second node local time recorded with a monotonically increasing clock of the second node;
   wirelessly transmitting the first node recorded local time by the first node to at least the second node;
   receiving the first node recorded local time at the second node and recording the first node local time of receiving the wirelessly transmitted packet;
   synchronizing a second node timing model with a first node timing model, wherein the first and second node timing models are updated at predetermined speeds to provide controlled time interval length adaptation; and
   synchronizing the first and second node timing models with a global clock associated with the first node and the second node.

2. The method of claim 1, wherein the wirelessly transmitted packet comprises a beacon transmitted from a wireless access point.

3. The method of claim 1, further including:
   synchronizing sample numbers of a multimedia stream on the second node with the second node timing model, the second node timing model having been synchronized with the first node.

4. The method of claim 3, wherein the synchronization of sample numbers in I/O operations is performed by timestamping IRQs (interrupt requests) with a global time according to the global clock.

5. The method of claim 1, further including repeating the method of claim 1 to generate an updated second node timing model to synchronize with the first node timing model.

6. The method of claim 1, further including:
recording a third node local time of receiving the wirelessly transmitted packet from the first node at a third node and recording the first node local time of receiving the wirelessly transmitted packet; and
synchronizing a third node timing model with the first node timing model and the second node timing model, and further synchronizing the first, second and third node timing models with the global clock associated with the first node, the second node, and the third node.

7. A machine-readable medium having stored thereon sets of instructions which when executed by a machine cause the machine to:
record a first node local time of receiving a wirelessly transmitted packet at a first node, the first node local time recorded with a monotonically increasing clock of the first node;
record a second node local time of receiving the wirelessly transmitted packet at the second node, the second node local time recorded with a monotonically increasing clock of the second node;
wirelessly transmit the first node recorded local time by the first node to at least a second node;
receive the first node recorded local time at the second node and record the first node local time of receiving the wirelessly transmitted packet;
synchronize a second node timing model with a first node timing model, wherein the first and second node timing models are updated at predetermined speeds to provide controlled time interval length adaptation; and
synchronize the first and second node timing models with a global clock associated with the first node and the second node.

8. The machine-readable medium of claim 7, wherein the wirelessly transmitted packet comprises a beacon transmitted from a wireless access point.

9. The machine-readable medium of claim 7, wherein the sets of instructions when executed further cause the machine to:
synchronize sample numbers of a multimedia stream on the second node with the second node timing model, the second node timing model having been synchronized with the first node.

10. The machine-readable medium of claim 9, wherein the synchronization of sample numbers in I/O operations is performed by time-stamping IRQs (interrupt reguests) with a global time according to the global clock.

11. The machine-readable medium of claim 7, wherein the sets of instructions when executed further cause the machine to:
record a third node local time of receiving the wirelessly transmitted packet from the first node at a third node and recording the first node local time of receiving the wirelessly transmitted packet; and
synchronize a third node timing model with the first node timing model and the second node timing model, and further synchronize the first, second and third node timing models with the global clock associated with the first node, the second node, and the third node.

12. A system comprising:
a first node to record a first node local time of receiving a wirelessly transmitted packet, the first node local time recorded with a monotonically increasing clock of the first node;
a second node to record a second node local time of receiving the wirelessly transmitted packet at the second node, the second node local time recorded with a monotonically increasing clock of the second node;
the first node to wirelessly transmit the first node recorded local time to at least the second node;
the second node to receive the first node recorded local time and record the first node local time of receiving the wirelessly transmitted packet; and
the second node to synchronize a second node timing model with a first node timing model, wherein the first and second node timing models are updated at predetermined speeds to provide controlled time interval length adaptation, and synchronize the first and second node timing models with a global clock associated with the first node and the second node.

13. The system of claim 12, wherein the wirelessly transmitted packet comprises a beacon transmitted from a wireless access point.

14. The system of claim 13, wherein the second node is further to:
synchronize sample numbers of a multimedia stream on the second node with the second node timing model, the second node timing model having been synchronized with the first node.

15. The system of claim 14, wherein the synchronization of sample numbers in I/O operations is performed by time-stamping IRQs (interrupt recquests) with a global time according to the global clock.

16. The system of claim 13, further including:
a third node to record a third node local time of receiving the wirelessly transmitted packet from the first node and record the first node local time of receiving the wirelessly transmitted packet; and
the third node to synchronize a third node timing model with the first node timing model and the second node timing model, and further to synchronize the first, second, and third node timing models with the global clock associated with the first node, the second node, and the third node.

* * * * *